(12) United States Patent
Fukui et al.

(10) Patent No.: US 8,001,415 B2
(45) Date of Patent: Aug. 16, 2011

(54) PROGRAM CONTROL METHOD FOR NETWORK DEVICES AND NETWORK SYSTEM

(75) Inventors: Daisuke Fukui, Kawasaki (JP); Akira Ioku, Tokyo (JP); Jun Maeoka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 12/179,141

(22) Filed: Jul. 24, 2008

(65) Prior Publication Data

US 2009/0083572 A1    Mar. 26, 2009

(30) Foreign Application Priority Data

Sep. 21, 2007   (JP) ................. 2007-244639

(51) Int. Cl.
*G06F 11/00* (2006.01)
(52) U.S. Cl. ............................................. 714/4.4
(58) Field of Classification Search ............... 714/2, 10, 714/4.4; 717/171
See application file for complete search history.

(56) References Cited

U.S. PATENT DOCUMENTS

| | | | | |
|---|---|---|---|---|
| 7,548,960 | B2 * | 6/2009 | Kang et al. ................ | 709/218 |
| 2004/0153823 | A1 * | 8/2004 | Ansari ........................ | 714/38 |
| 2006/0171453 | A1 * | 8/2006 | Rohlfing et al. ......... | 375/240.01 |
| 2008/0165789 | A1 * | 7/2008 | Ansari et al. ................. | 370/401 |
| 2010/0071053 | A1 * | 3/2010 | Ansari et al. ................... | 726/12 |

FOREIGN PATENT DOCUMENTS

| | | |
|---|---|---|
| JP | 2005-309617 | 11/2005 |
| JP | 2006-243915 | 9/2006 |
| JP | 2006-260425 | 9/2006 |

* cited by examiner

*Primary Examiner* — Scott T Baderman
*Assistant Examiner* — Yair Leibovich
(74) *Attorney, Agent, or Firm* — McDermott Will & Emery LLP

(57) ABSTRACT

The program control of network devices, each of which provides services according to the present invention, monitors a function of a program module operating in each of the network devices. If the function of the program module has a problem, the program control performs proxy response processing of the network device by a virtual device program until the problem is corrected. In addition, if the function of the program module has a problem, the program module operating in the network device is updated to the latest program module to correct the problem. Then, the operation of the virtual device program is stopped.

Thus, among devices which operate in cooperation with one another by use of a communications protocol such as UPnP, even if there is a device having a device program that includes a bug, or even if there is a device that has a performance problem, the devices can operate in cooperation with one another.

4 Claims, 11 Drawing Sheets

FIG.6

```xml
<?xml version="1.0"?>
<root xmlns="urn:schemas-upnp-org:device-1-0">
  <specVersion>
    <major>1</major>
    <minor>0</minor>
  </specVersion>
  <device>
    <deviceType>urn:schemas-upnp-org:device:deviceType:1</deviceType>
    <friendlyName>UPnPDeviceA</friendlyName>
    <manufacturer>manufacture name</manufacturer>
    <modelName>model name</modelName>
    <UDN>unid:UUID</UDN>
    <serviceList>
      <service>
        <serviceType>urn:schemas-upnp-org:service:serviceType:1</serviceType>
        <serviceId>urn:upnp-org:serviceId:serviceID</serviceId>
        <SCPDURL>http://192.168.0.1/serviceDescription.xml</SCPDURL>
        <controlURL>http://192.168.0.1/control</controlURL>
        <eventSubURL>http://192.168.0.1/event</eventSubURL>
      </service>
    </serviceList>
  </device>
</root>
```

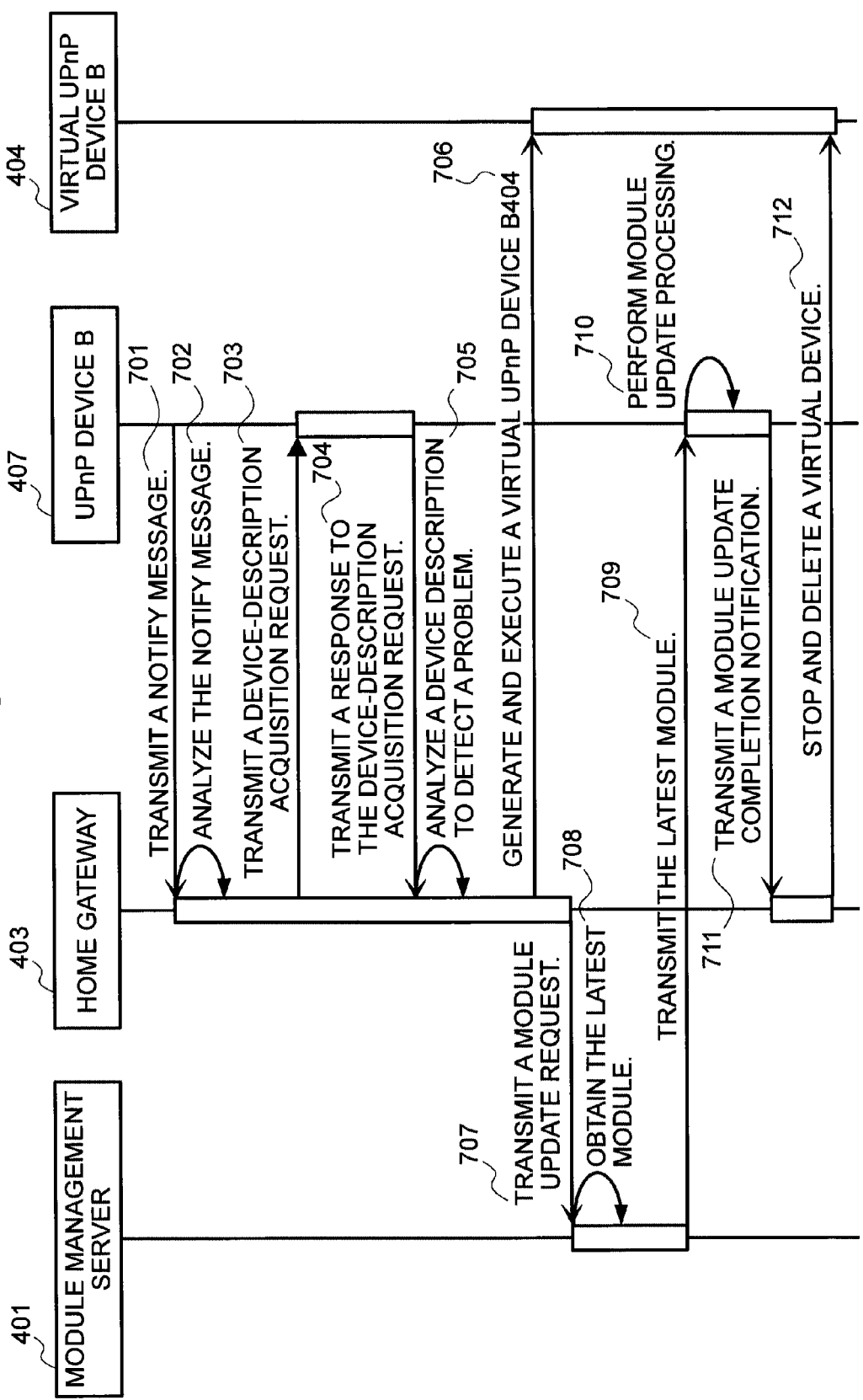

FIG.8

```xml
<?xml version="1.0"?>
<root xmlns="urn:schemas-upnp-org:device-1-0">
 <specVersion>
   <major>1</major>
   <minor>0</minor>
 </specVersion>
 <device>
   <deviceType>urn:schemas-upnp-org:device:deviceType:1</deviceType>
   <friendlyName>UPnPDeviceA</friendlyName>
   <UDN>uuid:UUID</UDN>
   <service>
     <serviceType>urn:schemas-upnp-org:service:serviceType:1</serviceType>
     <serviceId>urn:upnp-org:serviceId:serviceID</serviceId>
     <SCPDURL>http://192.168.0.1/serviceDescription.xml</SCPDURL>
     <controlURL>http://192.168.0.1/control</controlURL>
     <eventSubURL>http://192.168.0.1/event</eventSubURL>
   </service>
 </device>
</root>
```

FIG.9

```xml
<?xml version="1.0"?>
<root xmlns="urn:schemas-upnp-org:device-1-0">
 <specVersion>
  <major>1</major>
  <minor>0</minor>
 </specVersion>
 <device>
  <deviceType>urn:schemas-upnp-org:device:deviceType:1</deviceType>
  <friendlyName>UPnPDeviceA</friendlyName>
  <manufacture>manufacture name</manufacture>
  <modelName>model name</modelName>
  <UDN>uuid:UUID</UDN>
  <serviceList>
   <service>
    <serviceType>urn:schemas-upnp-org:service:serviceType:1</serviceType>
    <serviceId>urn:upnp-org:serviceId:serviceID</serviceId>
    <controlURL>http://192.168.0.1/control</controlURL>
    <eventSubURL>http://192.168.0.1/event</eventSubURL>
   </service>
  </serviceList>
 </device>
</root>
```

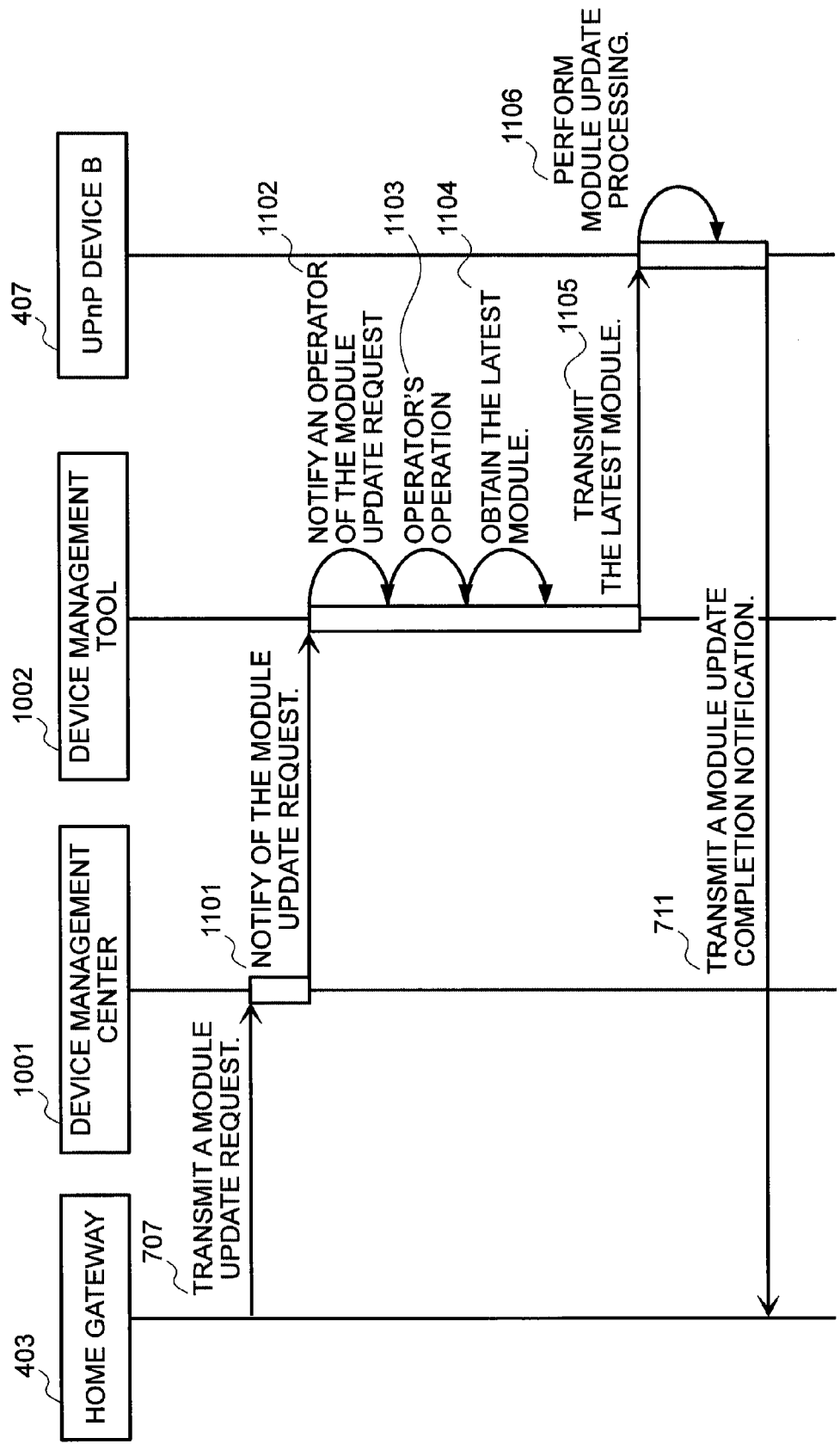

PROGRAM CONTROL METHOD FOR NETWORK DEVICES AND NETWORK SYSTEM

CLAIMS OF PRIORITY

The present application claims priority from Japanese application Ser No. JP2007-244639, filed on Sep. 21, 2007, the content of which is hereby incorporated by reference into this application.

BACKGROUND OF THE INVENTION

The present invention relates to technologies for monitoring a plurality of devices that are capable of communicating with one another through a network, and to technologies for managing each program module that operates in the devices.

In recent years, the home-use broadband network infrastructure has been built. As a result, the home network environment in which home information appliances with high functionality are connected with one another is attracting public attention. Such an environment is based on the assumption that home information appliances (devices), each of which is connected to a network, operate in cooperation with one another, and provide users with services having new added value.

Examples of technologies for controlling a plurality of devices, each of which is connected to a home network, include UPnP (UPnP is a registered trademark of UPnP Implementors Corporation, and is an abbreviation of "Universal Plug and Play"), and HAVi (HAVi is a registered trademark of HAVi Organization, and is an abbreviation of "Home Audio/Video Interoperability"). Communications protocols are specified for these standard technologies so that devices made by different manufacturers can cooperatively operate.

On the other hand, various kinds of mechanisms used to complement a function which cannot be supported by the standard technologies are devised. JP-A-2005-309617 discloses a method for operating a device, which is not supported by the standard technologies, as a device that is supported by the standard technologies. In addition, JP-A-2006-260425 discloses a method for bringing a device into a suspend state with attention paid to a power consumption problem of a device.

One of characteristics common to these technologies is that an access to a device is relayed through a proxy program for a communications protocol specified by the standard technologies. Because the communications protocol specified by the standard technologies does not depend on hardware of a device, it is possible to use such a proxy program. For example, in JP-A-2005-309617, it is possible to make an access, through a proxy program, from a device which is not supported by the standard technologies to a device which is supported by the standard technologies.

In addition, if a device which is supported by the standard technologies has a problem (bug) of a program, the program is remotely updated. This method is generally known (JP-A-2005-309617). This technology uses a method in which a program having a problem is remotely updated by use of an agent program that is a program operating in a device, and that is used to update other programs operating in the device.

In general, devices each supported by the standard technologies are developed by many manufacturers. Therefore, the strict conformity to a communications protocol is absolutely required so that the devices operate in cooperation with one another. However, the conformity to the communications protocol is not sufficiently achieved depending on devices, or there is a possibility that a device may have a problem (bug) of a program, or may have a performance problem (the processing speed of a program, the response speed of a response to a request, or the like). Therefore, there is a case where devices cannot normally operate in cooperation with one another.

For example, in the case of the UPnP technology, if data is defective (the data includes a device description which describes information about an UPnP device, and a service description which describes information about services provided by the UPnP device), or if the data cannot be acquired, there is a possibility that the UPnP device itself will not be detected from other devices. Moreover, it is specified that an UPnP device must reply to the device-description acquisition request within 30 seconds. However, there is a possibility that an UPnP device having a performance problem will not be able to reply to the device-description acquisition request within 30 seconds. Accordingly, there is a possibility that the UPnP device will not be detected from other devices.

It is difficult to estimate beforehand that a device which has such a problem will be connected to a network, and that a user will use the device. Therefore, a mechanism for remotely updating a program in a device as disclosed in JP-A-2006-243915 is desired.

However, although the method disclosed in JP-A-2006-243915 is capable of updating a program operating in a device, measures to be taken from a point of time at which a program having a problem is detected until a corrected program is provided are not taken into consideration. Therefore, a user cannot use a device until a program having a problem is corrected and updated, which is a problem to be solved.

An object of the present invention is to provide a program control method that is suitable for the cooperative operation of devices, each of which is connected to a network, by solving the above-described problem.

SUMMARY OF THE INVENTION

In order to solve the above-described problem, according to one aspect of the present invention, there is provided a program control method for network devices, each of which is connected to a network, and each of which provides the network with services, the program control method comprising the steps of: monitoring each function of a program module operating in each of the network devices; and if the function of the program module has a problem, performing proxy response processing of the network device by a virtual device program until the problem is corrected.

In addition, if the function of the program module has a problem, the program module operating in the network device is updated to the latest program module to correct the problem. Then, the operation of the virtual device program is stopped.

With the above-described means, when a problem of a device existing in a network is found, processing of correcting the problem of the device is performed, and at the same time, a virtual device program that makes a proxy response as a proxy for the device in question is executed. This allows a user to use the device until the problem of the device is corrected. Therefore, it is possible to smoothly perform cooperative operation.

BRIEF DESCRIPTION OF DRAWINGS

FIG. 6 is a diagram illustrating an example of a normal device description according to the first embodiment;

FIG. 7 is a diagram illustrating a sequence of module update processing according to the first embodiment;

FIG. 8 is a diagram illustrating an illegal device description according to the first embodiment;

FIG. 9 is a diagram illustrating an illegal device description according to the first embodiment;

FIG. 11 is a diagram illustrating a sequence of module update processing according to the second embodiment.

DESCRIPTION OF THE PREFERRED EMBODIMENTS

An embodiment of a program control method according to the present invention will be described in detail with reference to drawings as below.

Figure 1:
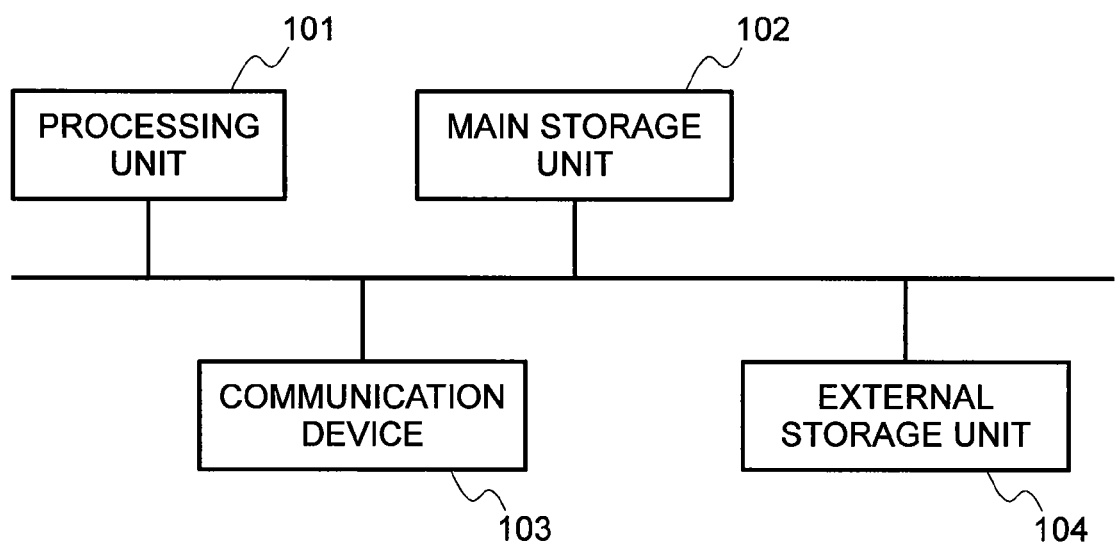
FIG. 1 is a diagram illustrating a hardware configuration assumed in the present invention.

FIG. 1 is a diagram illustrating a hardware configuration of the present invention. To be more specific, FIG. 1 illustrates a hardware configuration of an apparatus or device that is assumed to be used in the present invention. In this figure, a processing unit 101 is a central processing unit for handling an instruction that is loaded into a main storage unit 102. A main storage unit 102 is a volatile memory, or a non-volatile memory, for storing program data loaded from an external storage unit 104. A communication unit 103 is a unit that is connected to an outside network, and that transmits/receives data required by a program operating on hardware. The external storage unit 104 is a non-volatile memory for storing program data. Here, the external storage unit 104 may also be configured to be located on another machine that is connected through a network. In general, each of apparatuses (or each of devices) described in the present invention has a hardware configuration as shown in FIG. 1. However, the present invention is not limited to this configuration.

Figure 2:
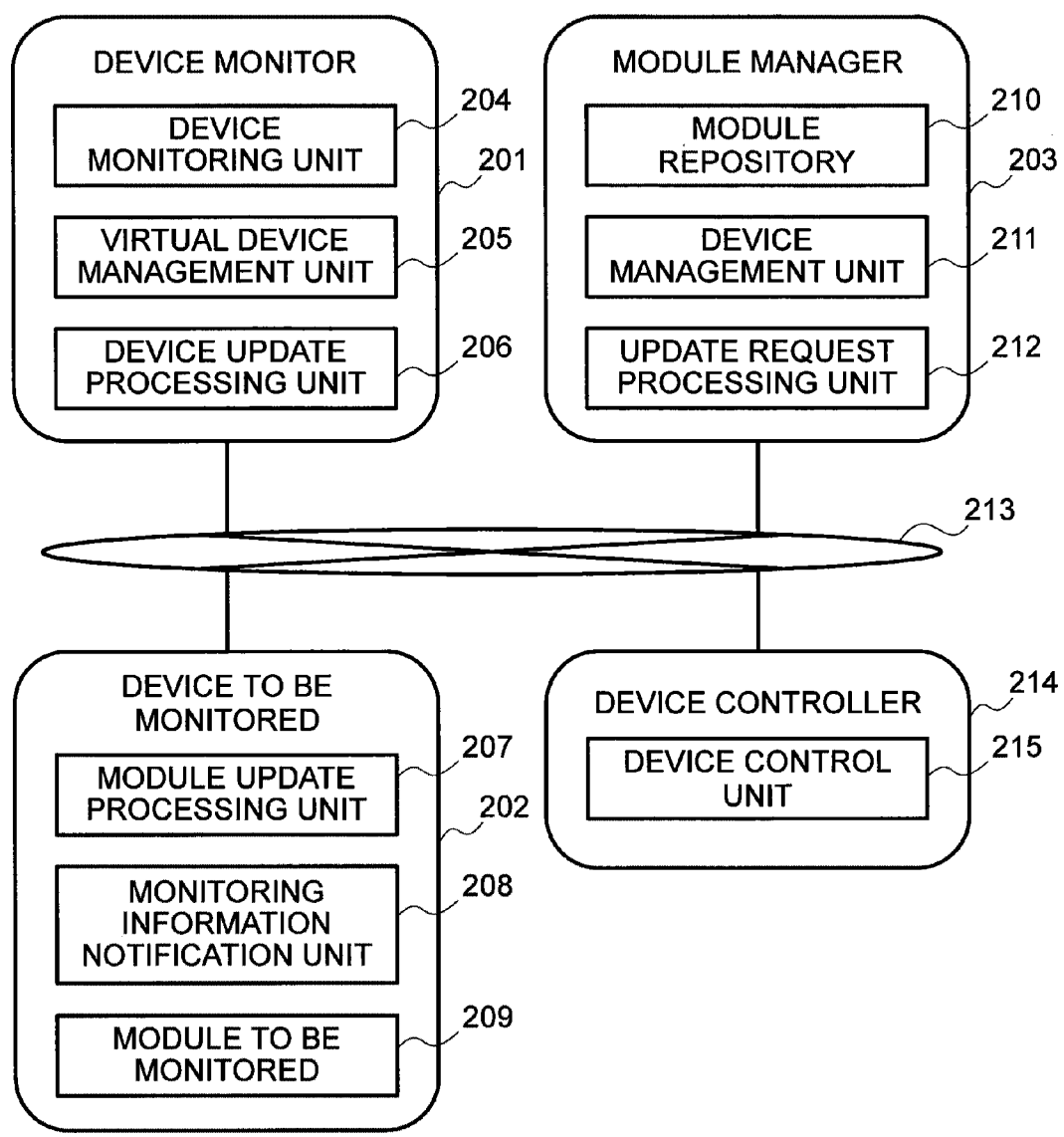
FIG. 2 is a diagram illustrating a general system configuration according to the present invention.

FIG. 2 is a diagram illustrating a general system configuration according to the present invention. In this figure, a device monitor 201 is a unit for monitoring the operation of a device to be monitored 202, and for, if a problem is detected during the operation of the device in question, automatically generating a virtual device program to perform processing of correcting the problem of the device in question. The device monitor 201 includes a device monitoring unit 204, a virtual device management unit 205, and a device update processing unit 206.

The device monitoring unit 204 is a program for monitoring a state of the device to be monitored 202 on the basis of device information that is provided by a monitoring information notification unit 208 of the device to be monitored 202, or on the basis of device information that is provided by a module to be monitored 209. Here, for example, according to the UPnP technology, the device information includes data of a NOTIFY message, and data of a device description, which are transmitted by an UPnP device. To be more specific, the device information corresponds to all pieces of information that are provided by the device to be monitored 202.

The device information which is provided by the monitoring information notification unit 208 includes all pieces of information from which it is possible to check an operation state of the device to be monitored 202. More specifically, the device information provided by the monitoring information notification unit 208 includes the device information provided by the module to be monitored 209, log information, and the profiling result. The device monitoring unit 204 is also capable of accessing the device to be monitored 202 so that the device information is acquired. For example, the device monitoring unit 204 is capable of using the UPnP protocol to transmit, to the device to be monitored 202, an ACTION message used for device operation so that the device information is acquired.

The virtual device management unit 205 is a program that is used to execute or stop a virtual device program according to a request from the device monitoring unit 204. The virtual device program is a program that is used to avoid a problem detected in the device to be monitored 202. The virtual device program is a proxy program that operates as a proxy for the device to be monitored 202.

As is the case with the device to be monitored 202 in which the problem has been detected, the virtual device program makes the device information open to the network 213. Accordingly, the device controller 214, which uses the device to be monitored 202, can operate as a proxy for the device to be monitored 202 in which the problem has been detected, so that the virtual device program can be detected and operated.

A device control instruction (for example, an operation instruction of a Web camera), which has been transmitted to the virtual device program by the device controller 214, is transmitted, by the virtual device program in question, to the device to be monitored 202 in which the problem has been detected. Thus, until the problem of the device to be monitored 202 is corrected, the virtual device program can make the device to be monitored 202 available by the device controller 214.

The device update processing unit 206 is a program that performs processing of correcting the problem detected in the device to be monitored 202 according to a request from the device monitoring unit 204. The processing will be described in detail later.

The device to be monitored 202 is a device that gives services (for example, service for providing a picture image by use of a Web camera) to other devices by use of a standard protocol such as UPnP. The device to be monitored 202 includes a module update processing unit 207, a monitoring information notification unit 208, and a module to be monitored 209.

The module update processing unit 207 is a program used to install the latest program module so as to correct the module to be monitored 209 in which the problem has been detected. In this embodiment, a program module is one unit of an updatable program, which is explicitly shown. A program module may also be merely expressed as a module. One or more program modules, which operate in cooperation with one another to perform processing, are merely designated as a program.

The module update processing unit 207 is mainly used to acquire the latest program module through the network. However, it is also thought that a user directly installs the latest program module by use of a CD-ROM or the like. The module update processing unit 207 generically means a program that performs processing of updating a program module to the latest version thereof. Therefore, the module update processing unit 207 is not limited to a particular program that is developed for the present invention.

Examples of programs operating as the module update processing unit 207 include the following programs:

(A) an agent program used for remote update of a program module;

(B) an installer program; and (C) a file system program.

The monitoring information notification unit 208 is a program that is used to monitor the operation of the module to be monitored 209, and to transmit device information to the device monitoring unit 204 of the device monitor 201. A logging program for outputting an operation state of the module to be monitored 209, and a monitoring program for monitoring an operation state of the module to be monitored 209, may also be used as the monitoring information notification unit 208.

The monitoring information notification unit 208 operates in cooperation with the device monitoring unit 204 that is specified according to the present invention. However, the monitoring information notification unit 208 is not limited to a particular program that is developed for the present invention. In addition, the processing of the monitoring information notification unit 208 is not indispensable, and accordingly, this processing can be excluded unless it is particularly necessary.

The module to be monitored 209 is an arbitrary program module that operates in the device to be monitored 202. The module to be monitored 209 is a program module supported by a communications protocol (for example, UPnP) that is used to remotely operate a device. If the module to be monitored 209 has a problem, the device monitoring unit 204 detects the problem. The virtual device management unit 205 then starts a virtual device program that operates as a proxy for the module to be monitored 209. The virtual device management unit 205 continues the execution of the virtual device program until the module update processing unit 207 updates the module to be monitored 209 to the latest program module.

The module manager 203 is a unit for managing the module to be monitored 209 that operates in the device to be monitored 202. The module manager 203 includes a module repository 210, a device management unit 211, and an update request processing unit 212.

The module repository 210 is a repository program for storing the latest version of the module to be monitored 209 that operates in the device to be monitored 202. For example, a database program or a file system program may also be used as the module repository 210. A general program for storing a program module can be used as the module repository 210. Accordingly, it is not necessary to use a particular program that is developed for the present invention.

The device management unit 211 is a program that is used to manage the device to be monitored 202. For example, a device management GUI (Graphical User Interface) program, which is used by an operator who manages the device to be monitored 202, may also be used as the device management unit 211. In addition, a device management server program supported by standard protocols, such as OMADM (Open Mobile Alliance Device Management) protocol, may also be used as the device management unit 211. A general program for performing device management can be used as the device management unit. Accordingly, it is not necessary to use a particular program that is developed for the present invention.

The update request processing unit 212 is a program that is used to acquire the latest program module from the module repository 210 according to a module update request from the device update processing unit 206, and to notify the device management unit 211 of an update request.

The latest program module acquired from the module repository 210 may also be transmitted to the module update processing unit 207 of the device to be monitored 202, or to the device update processing unit 206. The update request processing unit 212 operates in cooperation with the device update processing unit 206 that is specified according to the present invention. However, the update request processing unit 212 is not limited to a particular program that is developed for the present invention. In addition, the use of the update request processing unit 212 is not indispensable, and accordingly, this processing can be excluded unless it is particularly necessary.

The device controller 214 is a unit that uses a communications protocol such as UPnP to utilize a service provided by the device to be monitored 202. The device controller 214 includes a device control unit 215.

The device control unit 215 is a module for communicating with the module to be monitored 209 of the device to be monitored 202 by use of a communications protocol such as UPnP so that services provided by the device to be monitored 202 are utilized.

A network 213 is a network through which the device monitor 201, the module manager 203, the device to be monitored 202, and the device controller 214 are connected to one another. Here, the plurality of device monitors 201, the plurality of devices to be monitored 202, the plurality of module managers 203, and the plurality of device controllers 214 may also exist in the same network (LAN).

In addition, these units (and devices) may also exist in another network. In other words, the network 213 is not limited to the same network (LAN). In addition, the units (and devices) may also be configured with single hardware. To be more specific, this system configuration diagram does not illustrate physical separation of hardware, but illustrates a logical configuration of a program. Moreover, the module manager 203 can be excluded unless it is particularly necessary.

Figure 3:
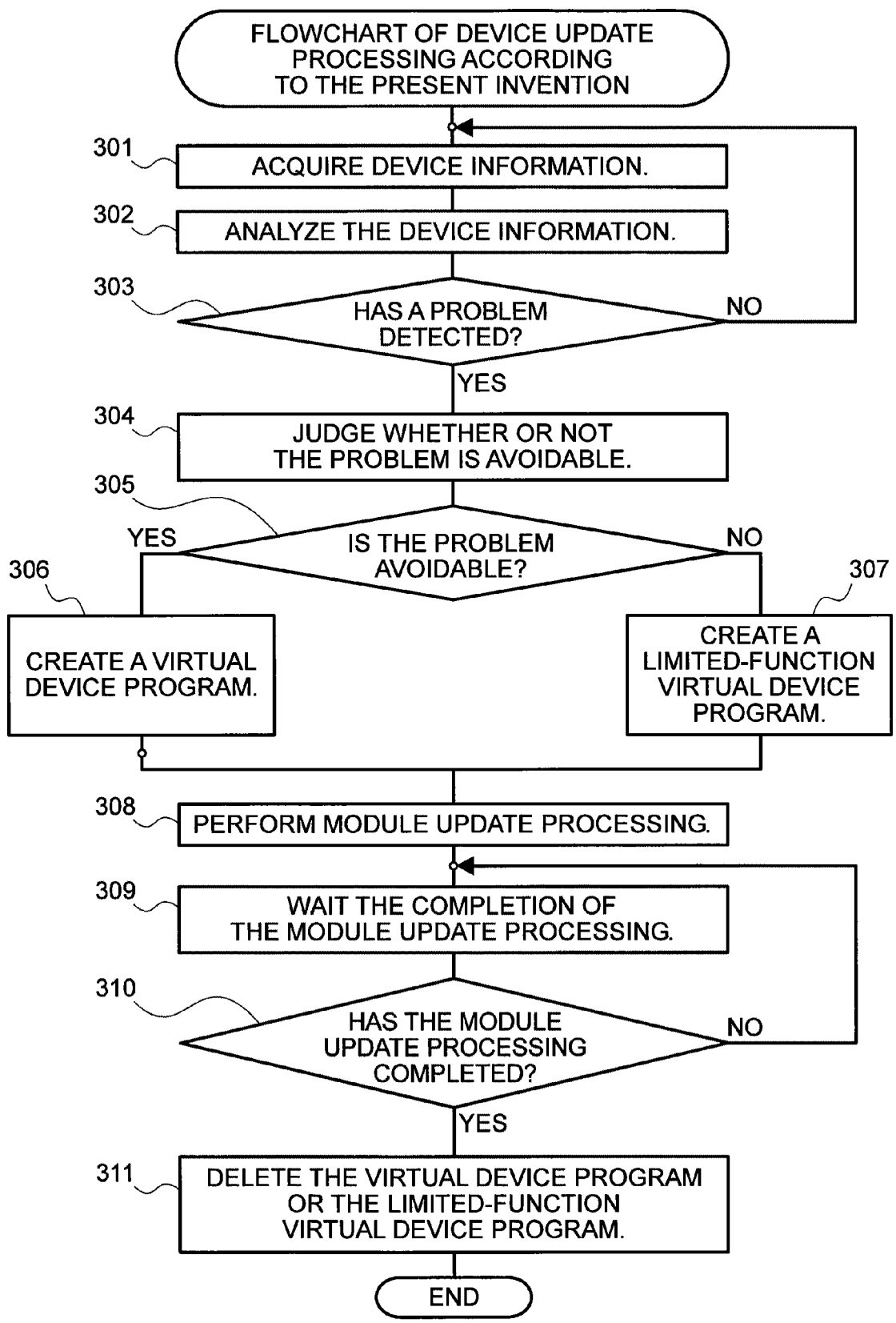
FIG. 3 is a flowchart illustrating general module update processing according to the present invention.

FIG. 3 is a flowchart illustrating device update processing according to the present invention. This flowchart merely shows general process flow according to the present invention. Accordingly, the flowchart does not limit the process flow.

A step 301 corresponds to processing of acquiring device information. In this step, the device monitoring unit 204 acquires device information such as log information from the monitoring information notification unit 208 of the device to be monitored 202, or from an operation state (transmission packet, or the like) of the module to be monitored 209, or from both of them.

A step 302 corresponds to processing of analyzing the device information that has been acquired in the step 301. In this step, on the basis of the acquired device information, the device monitoring unit 204 analyzes whether or not the device to be monitored 202 has a problem. For example, in the case of the UPnP technology, an analysis is made as to whether or not a device description transmitted from an UPnP device has a problem.

A step 303 is a step of judging whether or not a problem has been detected in step 302. If it is judged that a problem has been detected, the process proceeds to a step 304. In addition, if it is judged that a problem has not been detected, the process returns to the step 301.

A step 304 is a step of analyzing whether or not the problem is avoidable. In this step, the device monitoring unit 204 judges whether or not the detected problem is avoidable at a communications protocol level. For example, problems which are avoidable at a communications protocol level include such a problem that although part of a message transmitted from a device indicates an illegal value, the influence of the illegal part in question exerted on the whole system which uses the communications protocol is not significant, and at the same time, the illegal part can be complemented by temporary data. Details of the avoidable problems will be described later.

A step 305 is a step of judging whether or not the problem is avoidable as a result of the analysis made in the step 304. If it is judged that the problem is avoidable, the process proceeds to a step 306. If it is judged that the problem is not avoidable, the process proceeds to a step 307.

The step 306 is a step of generating and executing a virtual device program by the virtual device management unit 205. For example, in the case of the UPnP technology, if an indispensable tag of a device description which describes information about an UPnP device is defective, there is a case where it is not possible to find out the UPnP device depending on how the device control unit 215 which uses the UPnP device is implemented.

In such a case, the virtual device management unit 205 complements the indispensable tag of the device description by use of temporary data, and thereby generates a virtual device program which can normally operates, and then executes the generated virtual device program. The virtual device management unit 205 automatically generates the virtual device program on the basis of the device information that has been acquired from the device to be monitored 202.

The step 307 is a step of generating and executing a limited-function virtual device program by the virtual device management unit 205. A point of difference between the limited-function virtual device program and a normal virtual device program is that because the influence of a device's problem exerted on the whole system which uses the communications protocol is significant, functions are partially limited.

For example, in the case of the UPnP technology, it is thought that there is, for example, a case where because it is not possible to acquire a service description that is provided by an UPnP device, a service corresponding to the service description in question cannot be utilized. In such a case, the virtual device management unit 205 partially limits the functions by deleting the description about the service in question. However, for functions other than the limited functions, the virtual device management unit 205 generates a limited-function virtual device program which can normally operate, and then executes the limited-function virtual device program. The virtual device management unit 205 automatically generates the limited-function virtual device program on the basis of the device information that has been acquired from the device to be monitored 202.

A step 308 is a step of updating a module in which a problem has been detected. In this step, the device update processing unit 206 performs processing of correcting the module of the device having the problem according to a request from the device monitoring unit 204 or a request from the virtual device management unit 205.

This is, for example, the undermentioned processing. However, processing which is similar to the undermentioned processing suffices. Accordingly, the undermentioned processing does not limit the module update processing.

(A) notifying a user of an update request to update the module to be monitored 209 (for example, by displaying DIALOG, or through electronic mail);

(B) requesting the update request processing unit 212 of the module manager 203 to update the module to be monitored 209;

(C) requesting the device management unit 211 of the module manager 203 to update the module to be monitored 209; and (D) from the module repository 210 of the module manager 203, acquiring the latest module used to update the module to be monitored 209, and then transmitting the latest module to the module update processing unit 207.

The user, which has been notified of the update request to update the module to be monitored 209, can install by himself/herself the latest module to the device to be monitored 202 by general means (for example, purchasing a module in the latest version).

On the other hand, on the receipt of the module update request from the device update processing unit 206, the update request processing unit 212 performs, for example, processing as described below. However, processing which is similar to the undermentioned processing suffices. Accordingly, the undermentioned processing does not limit the module update processing.

(A) acquiring the latest module from the module repository 210, and then transmitting the latest module to the module update processing unit 207;

(B) acquiring the latest module from the module repository 210, and then transmitting the latest module to the device update processing unit 206;

(C) requesting the device management unit 211 to update the module to be monitored 209. The device update processing unit 206 may transmit the latest module to the module update processing unit 207. In this case, the update request processing unit 212 transmits the latest module to the device update processing unit 206.

In addition, if the device management unit 211 is requested by the update request processing unit 212 to update the latest module, the device management unit 211 acquires the latest module from the module repository 210 through the operation by an operator, or the like, and then transmits the latest module to the module update processing unit 207. The module update processing unit 207 installs, to the device to be monitored 202, the latest module transmitted by the module so that the problem is corrected.

A step 309 is a step of waiting the completion of the module update processing executed in the step 308. Here, the module update processing may also be periodically reexecuted if necessary (for example, a case where updating of the module is not completed for a fixed period of time).

When the latest module is installed, the module update processing unit 207 can transmit a notification thereof to the device update processing unit 206. However, the module update processing unit 207 is not required to explicitly transmit the update completion notification. In this case, by detecting the normal operation of a device having a problem by the device monitor 201, it is possible to judge whether or not the module update processing has been completed.

A step 310 is a step of judging whether or not updating of a module has been completed. If it is judged that the updating has been completed, the processing proceeds to a step 311. If it is not judged that the updating has been completed, waiting is made until the updating is completed, or the module update processing is reexecuted, in the step 309.

A step 311 is a step of stopping the execution of the virtual device program or limited-function virtual device program, which has been generated in the step 306 or 307, and of deleting the virtual device program or the limited-function virtual device program. In this step, the virtual device management unit 205 stops the processing of the virtual device program or limited-function virtual device program, which operates as a proxy for the device having the problem, and then ends the series of device update processing.

Up to this point, the flowchart of the general program control method according to this embodiment has been described.

First Embodiment

Next, a first embodiment in which the present invention is applied to a home network system will be described with reference to drawings.

Figure 4:
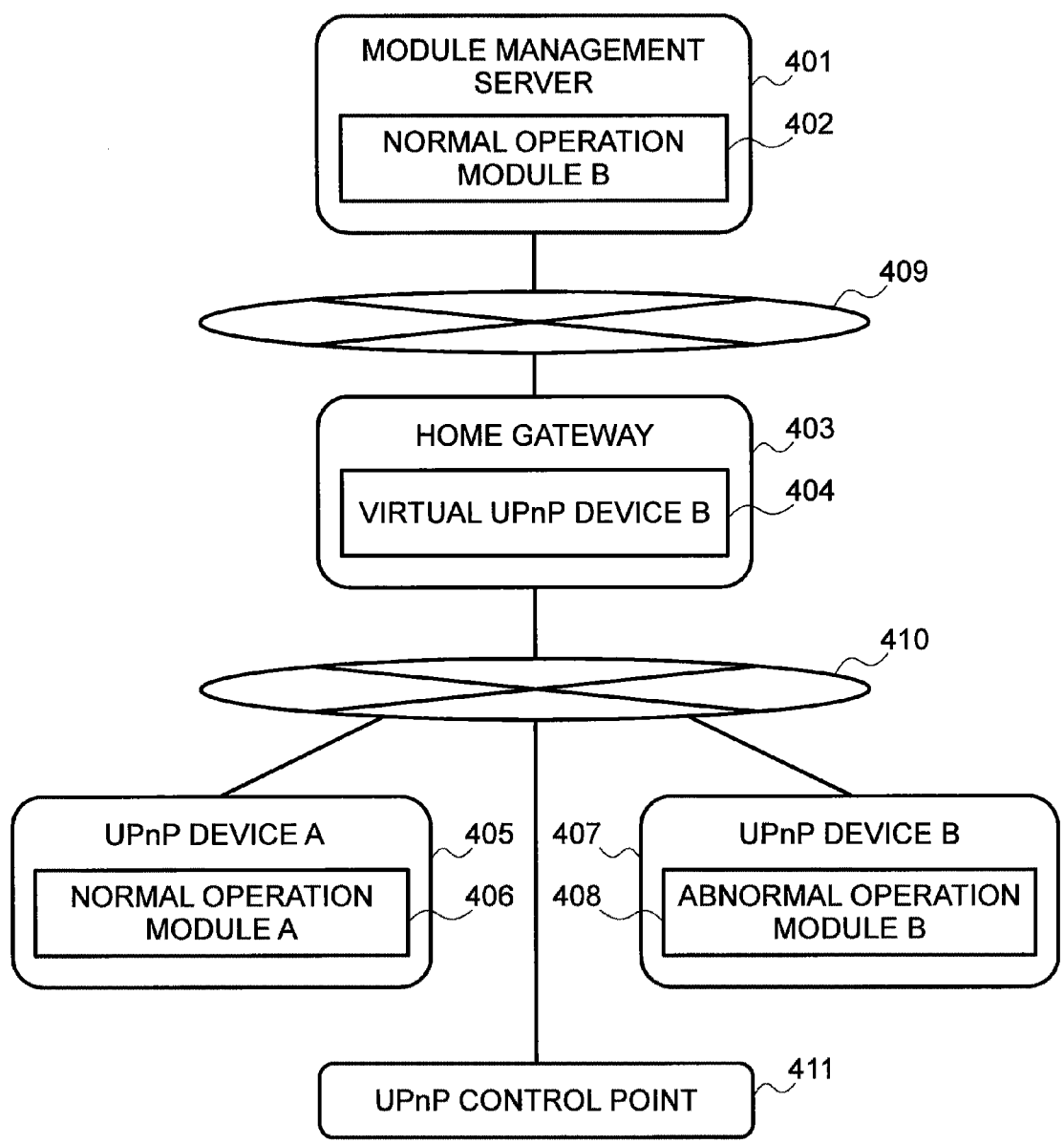
FIG. 4 is a diagram illustrating a system configuration according to a first embodiment.

FIG. 4 is a diagram illustrating a configuration of a system according to this embodiment. In this figure, a module management server 401 is the module manager 203 that is connected to a home gateway 403 through an external network 409. The module management server 401 manages the normal operation module B402. An abnormal operation module B408 having a problem operates on an UPnP device B407. A normal operation module B402 is the latest module in which the problem in questing has been corrected.

A home gateway 403 is a gateway server for connecting between a home network 410, which is an in-home LAN, and an external network 409. The home gateway 403 operates as the device monitor 201. In addition, a home gateway 403 is connected to an UPnP device A405, an UPnP device B407, and an UPnP control point 411 through the home network 410.

A virtual UPnP device B404 is a virtual device program operating as a proxy for the UPnP device B407 that has a problem caused by malfunction of the abnormal operation module B408. The virtual UPnP device B404 is automatically generated and executed by the home gateway 403.

The UPnP device A405 and the UPnP device B407 are devices to be monitored 202 whose state is monitored by the home gateway 403. The UPnP device A405 and the UPnP device B407 are UPnP devices that are operated by the UPnP control point 411 through the UPnP protocol. The normal operation module A406 is the module to be monitored 209 operating in the UPnP device A405. The normal operation module A406 is a normally operating module. The abnormal operation module B408 is the module to be monitored 209 operating in the UPnP device B407. The abnormal operation module B408 is a module whose operation has a problem.

The UPnP control point 411 is the device controller 214 for controlling the UPnP device A405 and the UPnP device B407 by use of the UPnP protocol.

The external network 409 is an out-of-home network, which connects the home gateway 403 to the module management server 401. The home network 410 is an in-home network that is used to connect the UPnP device A405, the UPnP device B407, and the UPnP control point 411 to the home gateway 403. Up to this point, the configuration of the system according to this embodiment has been described.

Figure 5:
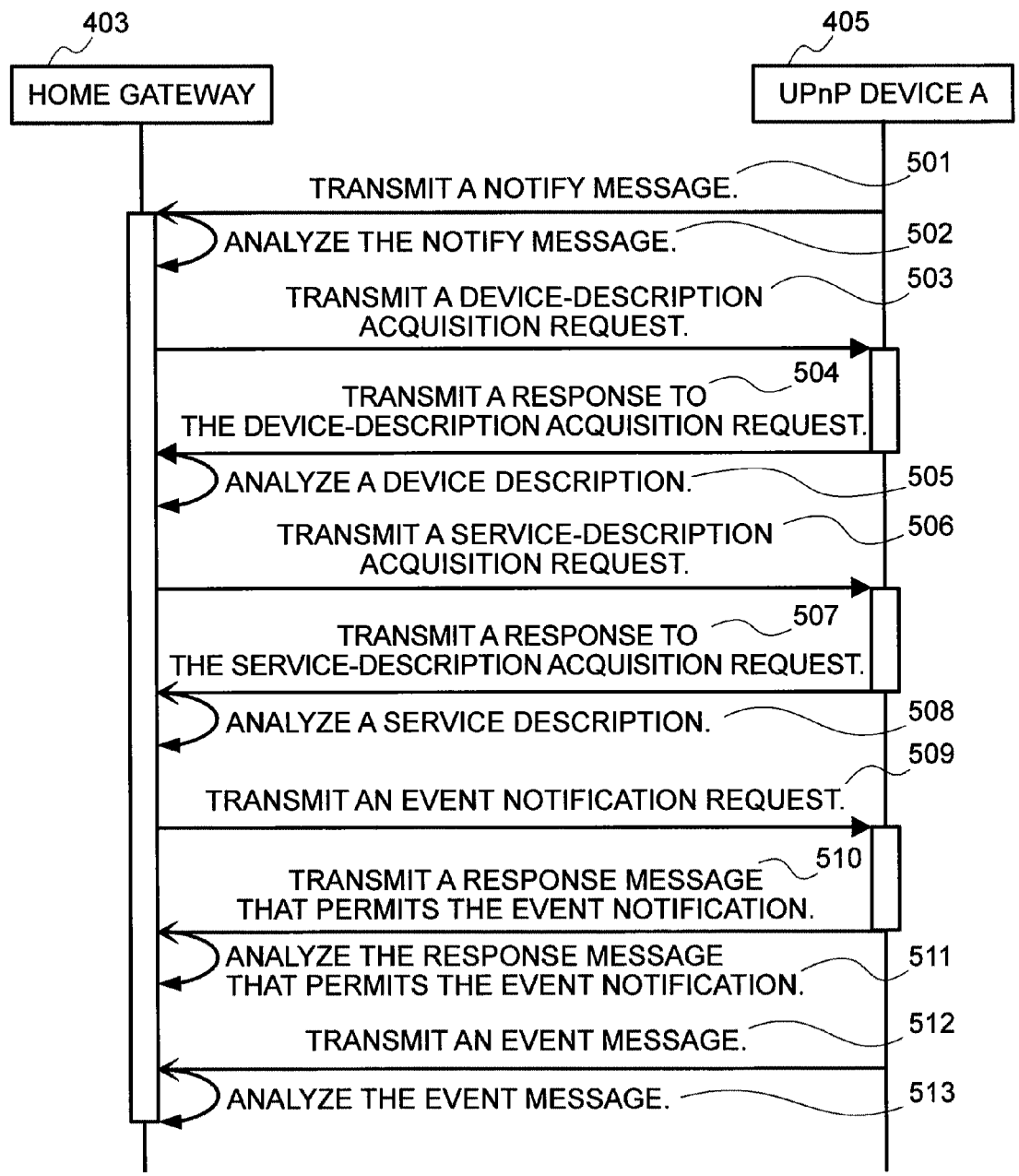
FIG. 5 is a diagram illustrating a general sequence of device information acquisition processing according to the first embodiment.

FIG. 5 is a sequence diagram illustrating an example of communications between the home gateway 403 and the UPnP device A405 according to this embodiment. In this example, the home gateway 403 and the UPnP device A405 use the UPnP protocol to perform the communications, and the home gateway 403 acquires device information of the UPnP device A405, and then analyzes the device information. Incidentally, this sequence diagram illustrates one example of the communications that use the UPnP protocol. Accordingly, the flowchart does not limit the process flow.

First of all, the UPnP device A405 transmits, to the home gateway 403, a NOTIFY message used to notify of the existence of the UPnP device A405 itself (sequence 501). A format of the NOTIFY message is specified by the UPnP Device Architecture 1.0 specification (hereinafter referred to as "UPnP specification"). The NOTIFY message is distributed by IP multicast.

Next, the home gateway 403 performs processing of analyzing whether or not the NOTIFY message received by the IP multicast is correct (sequence 502). If the home gateway 403 judges that the received NOTIFY message is normal, the home gateway 403 transmits, to the UPnP device A405, a device-description acquisition request according to the UPnP specification (sequence 503). The UPnP specification specifies that a device description is acquired by a GET request of HTTP.

Next, the UPnP device A405 transmits, to the home gateway 403, a response to the device-description acquisition request (sequence 504). When the home gateway 403 acquires a device description, the home gateway 403 analyzes whether or not a format of the acquired device description has a problem (sequence 505).

If the home gateway 403 judges that the device description which has been received according to the UPnP specification does not have a problem, the home gateway 403 transmits, to the UPnP device A405, a service-description acquisition request for a URL of a service description described in the device description (sequence 506).

The UPnP device A405 transmits, to the home gateway 403, a response to the service-description acquisition request (sequence 507). When the home gateway 403 acquires the service description, the home gateway 403 analyzes whether or not a format of the acquired service description has a problem (sequence 508).

If the home gateway 403 judges that the service description which has been received according to the UPnP specification does not have a problem, the home gateway 403 transmits, to the UPnP device A405, an event notification request for a URL used to issue the event notification request described in the device description (sequence 509). The UPnP specification specifies that this event notification request is handled by a SUBSCRIBE request that is the extension of HTTP.

If the UPnP device A405 judges that the event notification request does not have a problem, the UPnP device A405 transmits, to the home gateway 403, a response message that permits an even notification (sequence 510). The home gateway 403 analyzes whether or not a response message for the event notification request transmitted from the UPnP device A405 has a problem. The home gateway 403 then waits until the home gateway 403 is notified of an event (sequence 511).

Next, the UPnP device A405 transmits an event message to the home gateway 403 according to the UPnP specification, the event message having occurred in the UPnP device A405 (sequence 512). The home gateway 403 analyzes whether or not the event message which has been received from the UPnP device A405 has a problem. The home gateway 403 repeatedly performs the analysis processing until a problem is detected in this manner.

Up to this point, the example of the communications between the UPnP device A405 normally operating and the home gateway 403 has been described.

FIG. 6 is a diagram illustrating an example of a normal device description that is made open by the normal operation module A406 of the UPnP device A405. The device description is text data in the XML format specified by the UPnP specification. In the device description shown in FIG. 6, a serviceList tag is optional. However, all tags other than the serviceList tag are indispensable tags.

The existence of a serviceList tag means that the UPnP device A405 provides an UPnP service. The UPnP service provides interface specifications used to operate an UPnP device. The interface specifications are specified by a service tag of the device description in question, and by a service description referred to by an SCPDURL tag included in the service tag.

The UPnP control point 411, which uses the UPnP device A405, is capable of operating the UPnP device A405 by acquiring the device description and the service description.

FIG. 7 is a sequence diagram illustrating processing performed when the home gateway 403 communicates with the UPnP device B407 by use of the UPnP protocol, with the result that a problem of a device description transmitted from the UPnP device B407 has been detected. This sequence diagram illustrates an example of specific processing at the time of the detection of a problem. Therefore, the sequence diagram does not limit the process flow. In addition, because processing of sequences 701 through 704 is similar to the processing of the sequences 501 through 504 described in FIG. 5, the description thereof will be omitted.

In the sequence 705, the home gateway 403 analyzes a received device description to detect a problem. A specific example of the detected problem will be described later. If a problem is detected in the device description, the home gateway 403 generates the virtual UPnP device B404, and then starts the execution of the virtual UPnP device B404 (sequence 706). The virtual UPnP device B404 corrects an illegal device description provided by the UPnP device B407, and then provides the device description as a proxy for UPnP device B407. In this case, the virtual UPnP device B404 newly transmits a NOTIFY message to notify of a URL of the device description whose problem has been corrected.

The UPnP control point 411 receives the NOTIFY message to acquire the device description whose problem has been corrected, so that the UPnP control point 411 can use the UPnP device B407 from the start of the execution of the virtual UPnP device B404 up to the end of the execution thereof.

Next, the home gateway 403 transmits, to the module management server 401, an update request to update a module in which a problem has arisen (sequence 707). It is assumed that the update request in question is, for example, performed in the following manner (however, processing which is similar to the undermentioned processing suffices, and accordingly, the undermentioned processing does not limit the module update processing):

(A) operating an originally developed agent program on the module management server 401 so that the agent program in question handles the module update request;

(B) operating a HTTP server on the module management server 401 so that the HTTP server in question handles the module acquisition request;

(C) operating a database program on the module management server 401 so that the database program in question handles the module acquisition request; and (D) operating an OMADM protocol-capable device management server on the module management server 401 so that the device management server in question handles the module update request.

The sequence 707 is based on the assumption that a device management server program based on a protocol such as OMADM operates on the module management server 401. On the receipt of the module update request from the home gateway 403, the module management server 401 acquires the normal operation module B402 from a file system or the module repository 210 such as a database (sequence 708), and then transmits the normal operation module B402 to the UPnP device B407 (sequence 709).

The UPnP device B407 performs installation processing of the received normal operation module B402, and then updates the abnormal operation module B408 (sequence 710). On the completion of the installation of the normal operation module B402, the UPnP device B407 transmits an update processing completion notification to the home gateway 403 (sequence 711).

Here, the UPnP device B407 can also transmit a module update completion notification to the module management server 401. In this case, transmission processing of transmitting the module update completion notification to the home gateway 403 may also be performed by the module management server 401 instead of the UPnP device B407.

In addition, as described above, it is not necessary to explicitly transmit the update completion notification to the home gateway 403. Lastly, the home gateway 403 stops the execution of the virtual UPnP device B404, and then deletes the virtual UPnP device B404.

FIG. 8 is a diagram illustrating an example of a device description whose data can be completely complemented, the device description being one of illegal device descriptions that are made open by the abnormal operation module B408 of the UPnP device B407. The illustrated device description does not include a manufacturer tag and a modelName tag, both of which are indispensable for the UPnP protocol; and the illustrated device description does not include a serviceList tag that is indispensable as a parent tag of a service tag.

When such a device description is received, depending on the implementation of the UPnP control point 411, the UPnP device B407 may be judged to be an illegal UPnP device. Therefore, there is a possibility that the UPnP control point 411 will not be able to detect the UPnP device B407. However, although the indispensable tag is absolutely required at a protocol level, the operation of an UPnP device does not require the indispensable tag. Accordingly, a device description in which these tags are automatically complemented by temporary data is generated, and then the generated device description is made open.

The virtual UPnP device B404 multicast-distributes a NOTIFY message specified in the UPnP specifications so that an automatically generated device description is made open. The UPnP control point 411 receives the NOTIFY message to acquire a normal device description, so that the UPnP control point 411 can operate the UPnP device B407.

In addition, for example, even in the case where an ACTION message used to operate an UPnP device has a problem, the virtual UPnP device B404 can avoid the problem by automatically correcting the ACTION message that has been transmitted to the virtual UPnP device B404 by the UPnP control point 411, and then by transmitting the corrected ACTION message to the UPnP device B407. As described in the background art, it is possible to generate such a virtual UPnP device B404.

Besides the example of the illegal device description shown in FIG. 8, the avoidable problems are listed as follows (because these avoidable problems are listed as some examples, avoidable problems are not limited to specific problems):

(A) there is no NTS header that is an indispensable header of a NOTIFY message;

(B) a device description includes an illegal control character (0x00, or the like);

(C) there is no specVersion tag of a service description; and (D) there is no MX header that is an indispensable header of a M-SEARCH message.

FIG. 9 is a diagram illustrating an example of a device description whose data can not be completely complemented, the device description being one of illegal device descriptions that are made open by the abnormal operation module B408 of the UPnP device B407. The device description in question does not include a SCPDURL tag that is absolutely required for the UPnP specification.

When such a device description is received, the UPnP control point 411 cannot acquire a service description of a service provided by the UPnP device B407. Therefore, the UPnP device B407 is judged to be an illegal UPnP device, and accordingly, there is a possibility that the UPnP control point 411 will not be able to detect the UPnP device B407. In addition, because the SCPDURL tag is an indispensable tag that is absolutely required to utilize a service of the UPnP device B407, it is not possible to automatically set temporary data.

Accordingly, the home gateway 403 automatically generates a device description in which the service associated with SCPDURL of the UPnP device B407 has been deleted. The generated device description is then made open. The virtual UPnP device B404 multicast-distributes a NOTIFY message specified in the UPnP specifications so that the automatically generated device description is made open. The UPnP control point 411 receives the NOTIFY message to acquire a device description in which the service having the problem has been deleted, so that the UPnP control point 411 can partially utilize functions of the UPnP device B407.

Besides the example of the illegal device description shown in FIG. 9, the following is examples of the problems in which it is necessary to partially limit the functions of the UPnP device B407 (because these problems in which it is not possible to avoid the limitation of the functions are listed as some examples, such problems are not limited to specific problems):

(A) there is no LOCATION header that is an indispensable header of a NOTIFY message;
(B) it is not possible to acquire a device description (there is no device description);
(C) there is no action tag of a service description; and
(D) a SUBSCRIBE message cannot return a response.

Second Embodiment

Next, a second embodiment in which the present invention is applied to a home network system will be described with reference to drawings.

Figure 10:
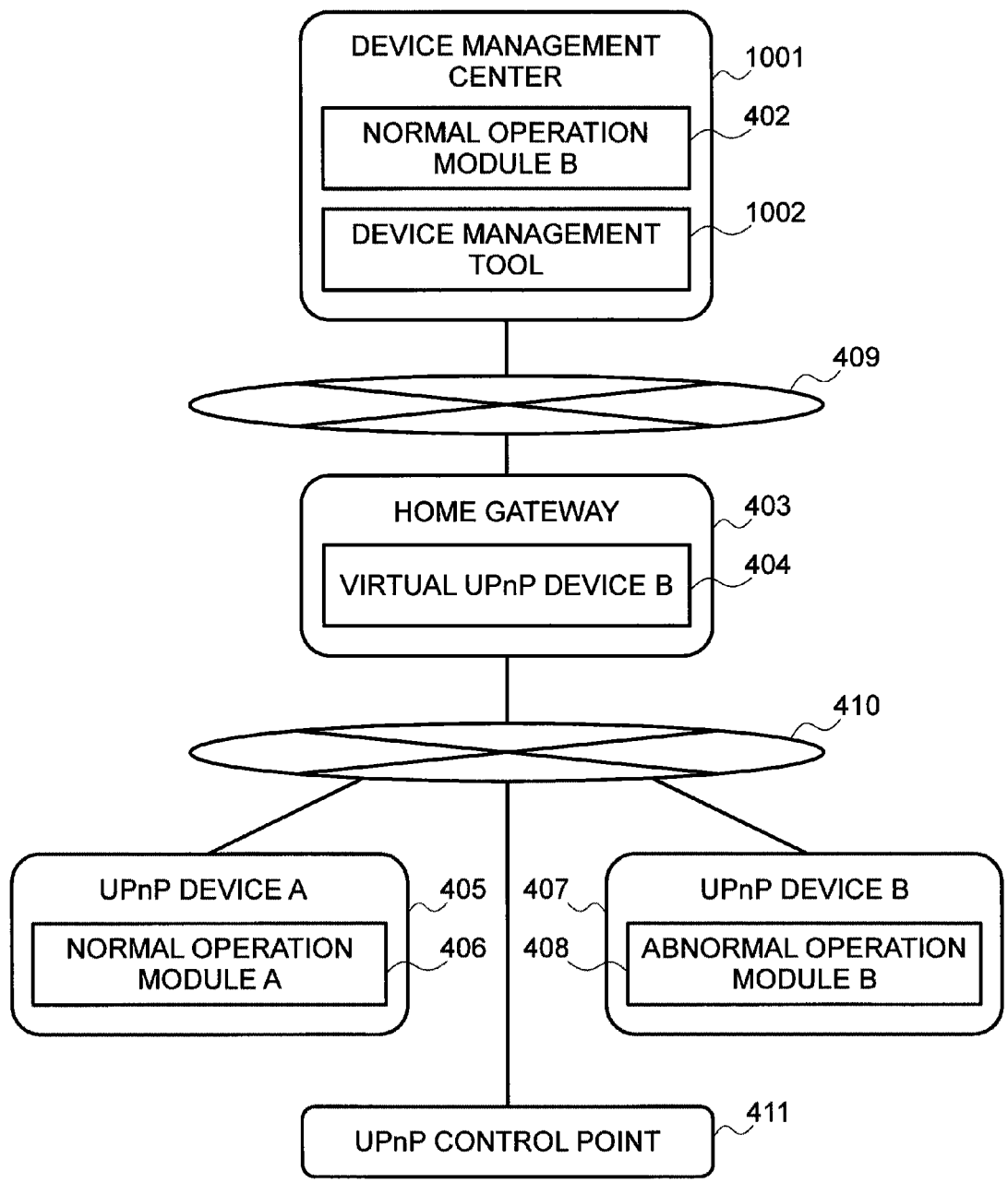
FIG. 10 is a diagram illustrating a system configuration according to a second embodiment.

FIG. 10 is a diagram illustrating a configuration of a system according to this embodiment. In this figure, the device management center 1001 is the module manager 203 for managing modules operating in the UPnP device A405 and in the UPnP device B407. In this embodiment, the device management center 1001 manages the normal operation module B402 that is the latest module of the abnormal operation module B408.

The device management tool 1002 is a program for the device management unit 211 included in the device management center 1001. The device management tool 1002 is a management GUI program that is used by an operator who manages the UPnP device A405 and the UPnP device B407. Because elements other than the device management center 1001 and the device management tool 1002 are configured in the same manner as those shown in FIG. 4, the description thereof will be omitted.

FIG. 11 is a sequence diagram illustrating module update processing according to this embodiment. This figure is made by changing processing of the sequences 707 through 711 among the sequences described in FIG. 7. FIG. 11 illustrates only the difference information. The processing is similar to the sequence described in FIG. 7 as a whole.

In the sequence 1101, on the receipt of a module update request from the home gateway 403, the device management center 1001 notifies the device management tool 1002 of the module update request. On the receipt of the module update request, the device management tool 1002 notifies an operator of the module update request by displaying DIALOG on an operation screen, or by notifying the operator of the module update request by electronic mail (sequence 1102).

On the receipt of the module update request, the operator operates the device management tool 1002 to start installation processing of the latest module (sequence 1103). In response to the operation from the operator, the device management tool 1002 acquires the normal operation module B402 from a file system or the module repositories 210 such as a database (sequence 1104), and then transmits the normal operation module B402 to the UPnP device B407 (sequence 1105). The UPnP device B407 performs installation processing of the received normal operation module B402 (sequence 1106), and then transmits a module update completion notification to the home gateway 403 (sequence 711).

Here, the UPnP device B407 can also transmit a module update completion notification to the device management tool 1002. In this case, transmission of the module update completion notification to the home gateway 403 may also be performed by the device management tool 1002 instead of the UPnP device B407. In addition, as described above, it is not necessary to explicitly transmit the update completion notification to the home gateway 403.

In this embodiment, the operator of the device management center 1001 is notified of the module update request. However, the home gateway 403 may notify a user who uses the UPnP device B407 of the module update request by directly displaying DIALOG. In this case, as soon as the latest module is installed by the user, the home gateway 403 judges from an operation state of the UPnP device B407 that the latest module has been installed. As a result, the home gateway 403 stops the operation of the virtual UPnP device B404.

Incidentally, the present invention is not limited to the above-described embodiments, and does not depend on a specific communications protocol.

What is claimed is:

1. A program control method for a network system including a device monitor and network devices, each of which is connected to a network, and each of which is supported by standard technologies specifying common communications protocol, said program control method comprising steps of:
monitoring each function of a program module operating in each of the network devices by the device monitor;
generating a virtual device program in the device monitor, if the function of the program module has a problem;
performing a proxy processing for the program module having the problem; and
performing proxy response processing of the network device which program module has the problem by the virtual device program in the device monitor until the problem is corrected,
wherein the network system includes an UPnP device as the network device, an UPnP control point that makes a service request to the UPnP device, and a home gateway as the device monitor for connecting between an external network and a home network to which the UPnP device and the UPnP control point are connected, said program control method further comprising the steps of:

in response to a first NOTIFY message from an UPnP device, requesting the UPnP device to transmit a device description;

detecting a problem of the device description acquired as a response to the request;

if the device description has a problem, generating a virtual device for performing proxy processing as a proxy for the UPnP device and correcting the device description having the problem provided by the UPnP device;

transmitting a second NOTIFY message from the virtual device; and using, by the UPnP control point which has received the second NOTIFY message from the virtual device, the virtual device as the UPnP device, wherein if the device description has a problem, the home gateway transmits, to the external network, an update request to update a program module of the UPnP device, the external network notifies the UPnP device having the problem of the latest program module, the UPnP device updates the program module, wherein the UPnP device which has updated the program module transmits a module update completion notification, and the virtual device stops functions thereof in response to the module update completion notification.

2. The program control method according to claim 1, wherein the each function of the program module operating in the network device is monitored by use of device information, the device information including profiling result of the program module and log information.

3. The program control method according to claim 1, wherein if the function of the program module has a problem, the program module operating in the network device which program module has the problem is updated to the latest program module to correct the problem, and then the operation of the virtual device program in the device monitor is stopped.

4. The program control method according to claim 1, generating a limited-function virtual device program if the detected problem is not avoidable.

* * * * *